US005803327A

United States Patent [19]

Nipper et al.

[11] Patent Number: 5,803,327

[45] Date of Patent: Sep. 8, 1998

[54] CRUTCH CUP HOLDER

[76] Inventors: Dale L. Nipper; Beverly J. Nipper, both of 801 S. Willis, Independence, Mo. 64052

[21] Appl. No.: 832,109

[22] Filed: Apr. 3, 1997

[51] Int. Cl.[6] ................................ B60R 7/00; B60R 9/00

[52] U.S. Cl. .................. 224/407; 224/148.7; 248/311.2; 135/66; 135/68

[58] Field of Search .................................... 224/407, 414, 224/448, 555, 558, 910, 274, 483, 148.7; 135/66, 68; 248/311.2, 312; D12/419, 420

[56] References Cited

U.S. PATENT DOCUMENTS

| | | | |
|---|---|---|---|
| 3,119,533 | 1/1964 | Kimes et al. | 224/274 |
| 3,734,439 | 5/1973 | Wintz | 248/311.2 |
| 3,985,148 | 10/1976 | Cadman | 242/84.1 |
| 4,036,463 | 7/1977 | Hopkins et al. | 248/311.2 |
| 4,146,045 | 3/1979 | Grant | 254/266 |
| 5,056,545 | 10/1991 | Spaeth | 254/344 |
| 5,101,845 | 4/1992 | Kravetz | 224/407 |
| 5,523,836 | 6/1996 | Sigsworth | 74/545 |

*Primary Examiner*—David J. Walczak
*Assistant Examiner*—Timothy L. Maust
*Attorney, Agent, or Firm*—Patent & Trademark Services, Inc.; Thomas Zack; Joseph H. McGlynn

[57] ABSTRACT

A cup holder or container holder attached to a crutch. A mounting assembly to mount the holder to the crutch has a threaded bolt with an end wing nut wherein the bolt extends outwardly from a conventional crutch handle or an adaptor with the bolt thereon. In either event, the holder receives the bolt's threaded end and a hand operated wing nut on the end permits the holder's attachment or removal from the exposed bolt. A gimbal pivotal joint may be attached to the holder to receive the bolt to allow the holder to pivot relative to the supporting crutch surface. The adaptor is a three sided bracket with an opened side used to receive the supporting surface. It also has two wing nuts with clamping bolts extending through one of its other bracket sides and a bolt for the holder's wing nut extending from another bracket side.

6 Claims, 1 Drawing Sheet

CRUTCH CUP HOLDER

BACKGROUND OF THE INVENTION

Anyone who is deprived of the normal use of any of their bodily functions, even for a short period of time, knows that the performance of normal everyday activities, such as carrying a cup with a liquid, may be reduced or severely restricted during that time. One reason this may occur is because the individual is required to use their limbs to manipulate some type of artificial device to get around such as a wheelchair, cane or crutches. The present invention is directed to an aid which is usable with such a device, in this case a crutch, which permits the user to manipulate the crutches and transport themself while still performing the everyday simple activity of transporting a container having a liquid in it.

DESCRIPTION OF THE PRIOR ART

Article holders that are attached to artificial devices used to assist a user in walking are known. For example, U.S. Pat. No. 3,985,148 to Cadman describes an attachment to a crutch having a compartment with a flat side and an opposite hinged side.

In U.S. Pat. No. 4,146,045 to Grant a crutch carrying attachment has outwardly opening grooves which engage the side rails of the crutch to secure the attachment. The patent (U.S. Pat. No. 5,056,545) to Spaeth describes a walking can with a resilient clip for holding a water bottle.

In the invention to Sigsworth (U.S. Pat. No. 5,526,836) a bag is attached to a crutch by straps which fit around the crutch's handgrips. The present invention relates to a removable cup holder attachment used with a crutch that can easily be removed by turning a hand operated nut as more further set forth in this specification.

SUMMARY OF THE INVENTION

This invention relates to a container holder attached to a crutch. A mounting assembly may be a threaded extension from the crutch's handle or an adaptor with an outwardly extending bolt. The holder receives the bolt's threaded end and a hand operated wing nut permits the holder's attached or removal from the bolt and crutch.

It is the primary object of the present invention to provide for an improved apparatus for mounting a container to a crutch.

Another object is to provide for such an apparatus which may be mounted to either a crutch or another supporting surface.

These and other objects and advantages of the present invention will become apparent to readers from a consideration of the ensuing description and the accompanying drawings.

DESCRIPTION OF THE PREFERRED EMBODIMENT

Figure 1:
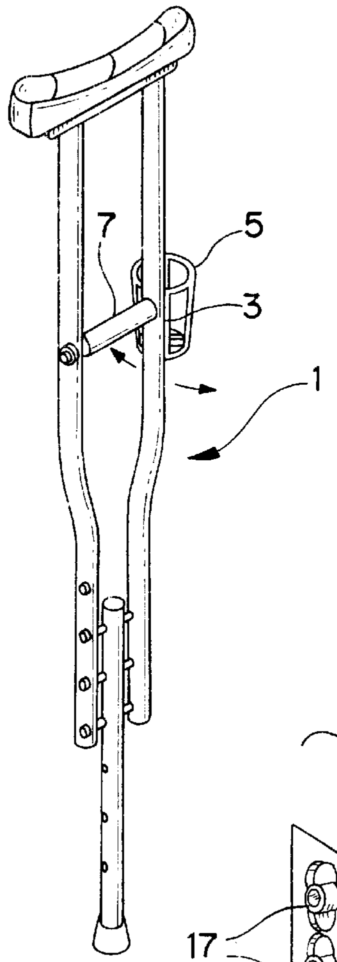
FIG. 1 is a front perspective view of the invention's preferred embodiment attached to a crutch.

FIG. 1 is a front perspective view of the invention's preferred embodiment attached to a crutch 1. The crutch is a conventional wooden or aluminum crutch having an interposed rotating gimbal or cylindrical pivot joint 3 attached to the top opened container or cup holder 5 permitting the joint and holder to swing relative to the supporting crutch. Gravity acts to maintain the movable cup holder in a vertical disposition as it rotates around its pivotal attachment.

Figure 2:
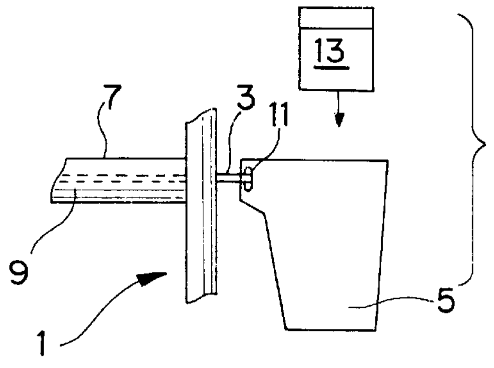
FIG. 2 is a side view of part of the FIG. 1 embodiment showing the cup holder attached to a crutch.

FIG. 2 is a schematic side view of the FIG. 1 cup holder 5 showing it attached to a supporting section of the crutch 1. Extending through the center of the crutch handle 7 is an elongated bolt 9 having a threaded exposed end on which the wing nut 11 may be screwed on to retain the cup holder 5 to the bolt and crutch. The joint 3 fixed to the holder fits over the end of the bolt 9. Various types of containers for liquids may be placed within the cup holder 5 such as the covered cup 13, an insulated bottle with a threaded or other cap, or any other suitable container that will fit within the confines of the holder. By reaching into and removing the wing nut 11, the installed cup holder may be removed from its attachment to the bolt 9 and crutch 1.

Figure 3:
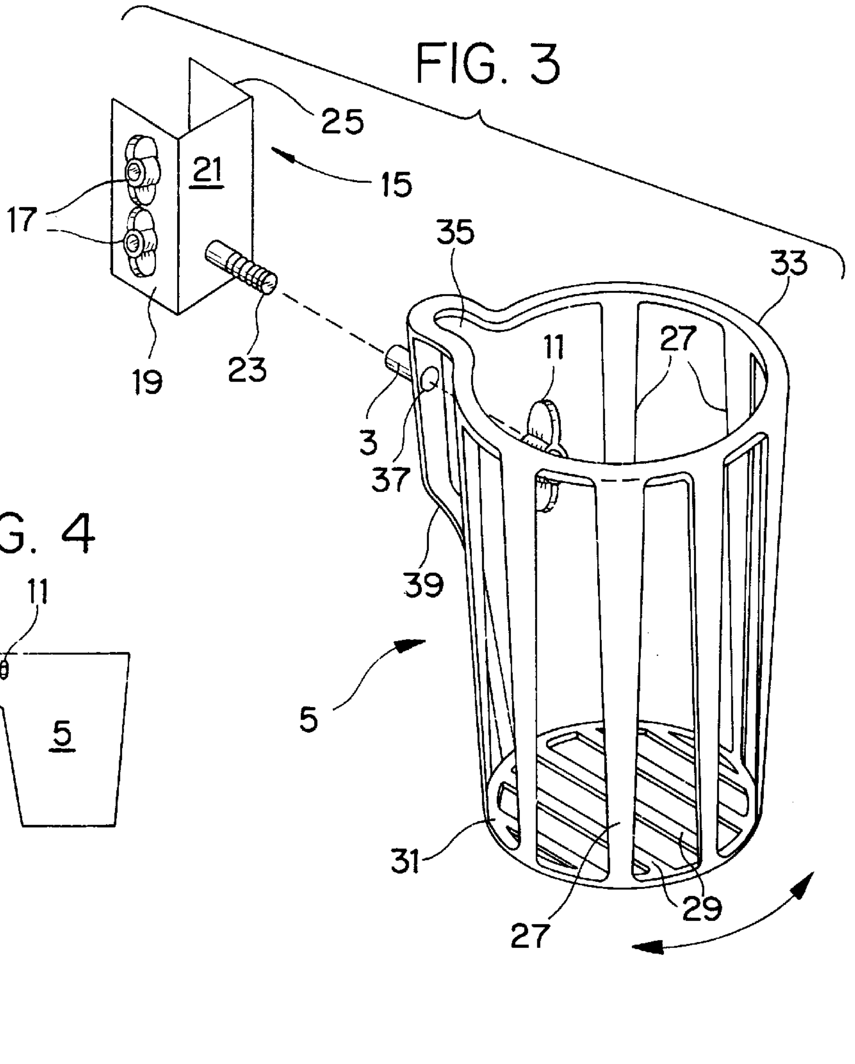
FIG. 3 shows a perspective side view of the cup holder and its clamp adaptor.

FIG. 3 shows a schematic perspective side view of the FIG. 1 cup holder with an added bracket clamp adaptor 15. This adaptor 15, not used in the FIG. 1 embodiment, is a clamp adaptor having an opened side and three closed planar sides which permit the mounting of cup holder 5 to a variety of different tubular surfaces and articles such as the vertical tubular leg of a crutch 1 or a suitable place on a lawn mower (e.g., handlebars), walker (legs), cane, etc.

When adaptor 15 is used, the previously described end of handle bolt 9 would not extend through the crutch's handle and have an exposed portion with threads. Each of the two adaptor wing nuts 17 are rigidly attached to a bolt (not shown) whose end can engage a support surface to permit the attachment 15 to be mounted on that surface by turning the wing nuts and their bolts to a tightened position. The adaptor's planar side 19 has threaded holes through its sides to receive the bolts turned by the wing nuts 17.

Located perpendicular to side 19 is front planar side 21 which has a fixed extending threaded bolt 23 on which the cup holder retaining wing nut 11 may engage. The adaptor's third planar side 25 is parallel to side 19 and perpendicular to side 21 and acts as a backing to engage one side of the support structure on which the adaptor 15 is mounted on. Thus, the suitable mounting surface for the adaptor would be placed through its opened side between the two parallel planar sides 19 and 25 with the retaining bolts of the two wing nuts 17 tightened to engage the supporting surface side nearest side 19.

Also shown in FIG. 3 are more details for the cup holder 5. The coup holder is made of durable ABS (Acrylonitrile-butadiene-styrene) plastic material and resembles a basket with elongated straight solid vertical 27 and horizontal members 29 with opened spaces between them. The circular bottom 31 is molded to join with the opened members 29. The top rim 33 is substantially circular around except for the protruding section 35 where it joins the adaptor 15 (or the bolt's end 9 in the FIG. 1 embodiment). This protruding holder section has a clearance hole 37 through a vertical member 39 which receives the end of bolt 23 (or the end of bolt 9 in FIG. 1) after the bolt passes through the opened cylindrical pivot gimbal sleeve 3 attached to the hole 37 and holder 5. The tightened wing nut 11 pivotally maintains the holder on the bolt 23 and its adaptor 15.

Figure 4:
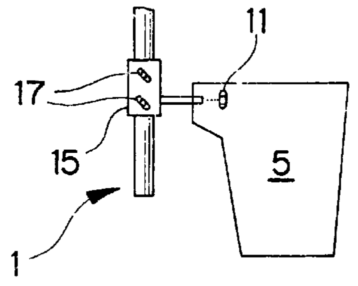
FIG. 4 shows a schematic side view of the cup holder and adaptor used in FIG. 3.

FIG. 4 shows a schematic side view of the cup holder and attachment used in FIG. 3. The support surface engaged by the bolts attached to the two wing nuts 17 is a vertical section of the crutch 1. Clearly other support surfaces which fit through its opened side between the two opposite parallel planar sides of adaptor 15 could also be used.

In use, a user would remove the wing nut 11 from the exterior side near the cup holder to remove the holder. If the adaptor 15 were used (FIG. 3) then its wing nuts 17 would be loosened to remove it from its supporting surface.

Many of the components of the cup holder including holder 5 may be manufactured using the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the cup holder). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's cup holder cost effectively.

The adaptor clamp 15 can be manufactured of "off the shelf" extruded aluminum which is cut to the desired length and has two threaded holes installed on one of its sides for the wing nuts 17 and another threaded hole on the adjoining side to receive the bolt 23. The metal extrusion process can be used for this purpose. The metal extrusion process is one whereby molten, heat softened metal is forced under high pressure through a die, similar to toothpaste being squeezed through the hole in the tube, (in this example the hole in the tube is the die). The metal forms a continuous length in the shape of the die it was squeezed through. In other words the metal would come out continually in the shape of a rod using the nozzle of the toothpaste tube as a die, but would come out in the shape of a square if the die were square. In this case the metal extrusion would take on the shape of the adaptor planar sections. Many familiar parts you deal with on a weekly basis were more than likely extruded. Metal rods, bars, and flats and similar items are all manufactured using the extrusion process.

The adaptor clamp could be anodized to prevent oxidation from exposure to weather. Anodizing is similar to the electroplating process, and provides a hardened, weatherproof outer surface. An intentional oxidation is placed upon the surface of the aluminum, creating a protective, microthin layer. This is accomplished by placing the aluminum to be anodized in a tank with an acid solution. One side of a direct current voltage is applied to the aluminum piece to be anodized, and the other side of the direct current voltage is applied to a lead electrode, causing the surface of the aluminum to become oxidized and porous. Color may be applied to the aluminum in it's porous state and later sealed. After careful removal of any residue chemicals, the porous aluminum is sealed by boiling it in water for a period of time.

The wing nuts disclosed including the bolts for the adaptor can be installed by hand. The pivot cylindrical gimbal 3 mounted to the holder 5 may be installed and fixed in place by hand. Commercial sources for these off the shelf wing nuts, gimbal and bolts may be obtained by consulting manufacturers listed in The Thomas Register of American Manufacturers.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A combined crutch and attachable container holder apparatus comprising:

a crutch having a support handle;

a support mounting assembly mounted on the crutch adjacent its handle with a bolt member extending from the crutch having an exposed threaded bolt end;

a wing nut adapted to engage and fit on the threaded bolt end and be tightened thereto;

a container holder having a pivotal joint thereon mounted on the bolt between the container holder and the support mounting assembly, said pivot joint permitting the container holder to pivot relative to the crutch when the wing nut is tightened on the bolt and engaged on the bolt's end.

2. The invention as claimed in claim 1, wherein said support mounting assembly crutch surface includes the crutch's handle with its bolt member extending outwardly from the side of the crutch.

3. The invention as claimed in claim 2, wherein said support mounting assembly crutch surface includes a clamp adaptor interposed between the holder and the crutch's mounting surface.

4. The invention as claimed in claim 3, wherein said clamp adaptor has an opened crutch receiving side and three planar sides extending around the received crutch supporting surface and means to hold the three sides to the crutch.

5. The invention as claimed in claim 4, wherein said means for holding the adaptor's three sides to the crutch includes at least one bolt tightenable by an exposed wing nut.

6. The invention as claimed in claim 1, wherein said holder is a cup holder with opened sides and a protruding side having a hole therein to receive the bolt's exposed end.

* * * * *